US008056842B2

(12) United States Patent
Topaz

(10) Patent No.: US 8,056,842 B2
(45) Date of Patent: Nov. 15, 2011

(54) COLOR POWDER FOR COATING

(75) Inventor: Giora Topaz, Even Yehuda (IL)

(73) Assignee: Tecolor Ltd., Kefar Neter (IL)

( * ) Notice: Subject to any disclaimer, the term of this patent is extended or adjusted under 35 U.S.C. 154(b) by 509 days.

(21) Appl. No.: 12/346,953

(22) Filed: Dec. 31, 2008

(65) Prior Publication Data

US 2009/0297800 A1 Dec. 3, 2009

Related U.S. Application Data

(63) Continuation-in-part of application No. PCT/IB2008/054014, filed on Oct. 2, 2008.

(60) Provisional application No. 61/129,069, filed on Jun. 3, 2008.

(51) Int. Cl.
*B02C 19/00* (2006.01)

(52) U.S. Cl. .................. 241/25; 241/101.8; 366/160.5

(58) Field of Classification Search .............. 366/160.5; 241/25, 101.8
See application file for complete search history.

(56) References Cited

U.S. PATENT DOCUMENTS

| 5,319,001 A | 6/1994 | Morgan |
| 5,856,378 A | 1/1999 | Ring |
| 5,912,283 A | 6/1999 | Hashizume |
| 6,113,979 A | 9/2000 | Sagawa |
| 7,649,034 B2 | 1/2010 | Ladatto |
| 2003/0181570 A1 | 9/2003 | Ladatto |
| 2003/0191230 A1 | 10/2003 | Ladatto |
| 2006/0106134 A1 | 5/2006 | Ladatto |
| 2009/0158963 A1* | 6/2009 | O'Dell et al. .............. 106/422 |

FOREIGN PATENT DOCUMENTS

| EP | 0372860 B2 | 6/1990 |
| EP | 0412888 | 2/1991 |
| EP | 0755986 | 1/1997 |
| EP | 0899024 | 3/1999 |
| EP | 1026212 | 8/2000 |
| EP | 1347021 A1 | 9/2003 |
| EP | 1430945 A1 | 6/2004 |
| EP | 1339806 | 10/2005 |
| EP | 1659156 | 5/2006 |
| GB | 1474596 | 5/1977 |
| IL | 94594 B1 | 2/1994 |
| WO | 2007/050417 A1 | 5/2007 |
| WO | 2007/126637 | 11/2007 |

* cited by examiner

*Primary Examiner* — Mark Rosenbaum

(74) *Attorney, Agent, or Firm* — Fennemore Craig, P.C.; Rodney J. Fuller

(57) ABSTRACT

A method for producing a color powder concentrate, the method comprising: performing a first dry-mixing of a base powder with an excess amount of a pigment powder to produce an initial mixture; filtering out pigment agglomerates larger than a pre-determined size, to produce a sieved mixture; and performing a second dry-mixing of the sieved mixture with a compensatory amount of a base powder to produce the color powder concentrate, wherein the compensatory amount of the base powder may be determined based on the excess amount of the pigment powder and on an amount of the pigment agglomerates filtered out.

20 Claims, 5 Drawing Sheets

COLOR POWDER FOR COATING

CROSS REFERENCE TO RELATED APPLICATIONS

This application is a continuation in part of PCT Patent Application No. PCT/IB2008/054014, filed Oct. 2, 2008, and claims the benefit of U.S. Provisional Patent Application No. 61/129,069, filed Jun. 3, 2008. The disclosures of both these applications are incorporated herein by reference in their entirety.

FIELD OF THE DISCLOSURE

Embodiments of the disclosure relate to a color powder for coating.

BACKGROUND

Powder coating is a technique of applying dry paint, in the form of a powder, to a substrate. Powder coating is frequently used for the coating of metal products such as automobile parts, as well as for the coating of substrates of different materials.

In order to color a substrate with a powder, the powder is usually first applied to the substrate by using a spray gun, an electrostatic disc, a magnetic brush, or by simply dipping the substrate into the powder. The powder may be imparted with an electrostatic charge, so that when the substrate is electrically grounded or charged negatively, the charged powder adheres to the substrate. Then, heat may be applied to the powder and/or to the substrate, commonly in the range of 100-250° C. The heat causes melting of the powder and binds it to the substrate. Then, the powder may be allowed to cool down and cure. The cured, melted powder forms a coating on the substrate.

Powder coating is usually produced by mixing one or more base powders containing a polymeric melting member with one or more pigments. The mixture is heated and melted in an extruder to form a colored melt. In the melting process, particles of the base powders and the pigments mix essentially uniformly. The colored melt is cooled down and processed by the extruder into various forms such as chips or pellets. The extruded product is then fed into a grinder and is ground into a color powder essentially ready to be applied. This color powder commonly includes particles which are agglomerates of both the base powder and the pigments. That is, the extrusion process is capable of blending the base powder and the pigments in a highly uniform manner.

Although an extrusion process has the advantage of creating a highly uniform color powder, it is said to have some major drawbacks in the form of costs and efficiency. An extruder is a highly expensive machine, with some extruders being retailed in the range of hundreds of thousands of dollars. In addition, a single extrusion process creates a powder of a single color—the outcome of the pigments and base powder(s) fed into the extruder. This color normally cannot be changed later, especially not by an end-user who purchased the color powder with the intention of applying it to a substrate. An industrial extruder usually has a relatively high capacity, often in the range of half a ton to one ton. Therefore, if a color powder manufacturer is being requested to produce a smaller quantity of a certain color powder, the manufacturing may not be economical. Extrusion is said to be suitable for relatively large quantities of color powder, in the range of 0.5-1 ton capacity of a typical industrial extruder.

U.S. Pat. No. 5,319,001 to Morgan et al. discloses a process for the preparation of a colored powder coating composition. PCT Publication no. WO2007/050417 to O'Dell et al. discloses a method for coloring powders, including mixing a base powder and non-incorporated pigments. U.S. Pat. No. 5,856,378 to Ring et al. discloses a powder coating composition which includes composite particles that are agglomerates of individual particulate components fused or bonded together. U.S. Pat. No. 6,113,979 to Sagawa et al. discloses a powder coating used in a method for forming a coating on the surface of materials.

SUMMARY

There is provided, according to an embodiment, a method for producing a color powder concentrate, the method comprising: performing a first dry-mixing of a base powder with an excess amount of a pigment powder to produce an initial mixture; filtering out pigment agglomerates larger than a pre-determined size, to produce a sieved mixture; and performing a second dry-mixing of the sieved mixture with a compensatory amount of a base powder to produce the color powder concentrate, wherein the compensatory amount of the base powder is determined based on the excess amount of the pigment powder and on an amount of the pigment agglomerates filtered out.

In some embodiments, the method further comprises dry-mixing the color powder concentrate with an additional amount of a base powder, to produce a color powder adapted to be applied in a color coating process.

In some embodiments, the pigment powder comprises at least 50 wt % particles having a diameter of 5 μm or less.

In some embodiments, the method further comprises dry-mixing the color powder concentrate with an additional amount of a base powder, to produce a color powder adapted to be applied in a color coating process.

In some embodiments, the method further comprises grinding the pigment powder prior to the first dry-mixing.

In some embodiments, the method further comprises dry-mixing the color powder concentrate with an additional amount of a base powder, to produce a color powder adapted to be applied in a color coating process, wherein the color powder is adapted to provide a substrate onto which the color powder is applied with a substantially uniform appearance.

In some embodiments, at least one of the base powder and the compensatory amount of base powder comprises a neutrally-colored base powder.

In some embodiments, at least one of the base powder and the compensatory amount of base powder comprises at least one additive selected from a group consisting of: a matting agent, a flowing agent and a sand-effect agent.

In some embodiments, at least one of the first and the second dry-mixing comprises dry-mixing in a mixer.

In some embodiments, the dry-mixing in the mixer comprises operating the mixer for 15 to 30 minutes.

In some embodiments, the pigment agglomerates larger than a pre-determined size comprise pigment agglomerates larger than 80 μm in diameter.

In some embodiments, the pigment agglomerates larger than a pre-determined size comprise pigment agglomerates larger than 100 μm in diameter.

There is further provided, according to an embodiment, a method for producing a color powder concentrate, the method comprising: performing a first dry-mixing of a base powder with an excess amount of a pigment powder to produce an initial mixture; filtering out pigment agglomerates larger than a pre-determined size, to produce a sieved mixture; and performing a second dry-mixing of the sieved mixture, wherein the excess amount of the pigment powder is pre-determined based on a predicted amount of the pigment agglomerates filtered out.

There is further provided, according to an embodiment, a method for producing a color powder, the method comprising: grinding a pigment powder; performing a first dry-mixing of a base powder with the pigment powder, to produce an initial mixture; filtering out pigment agglomerates larger than a pre-determined size, to produce a sieved mixture; performing a second dry-mixing of the sieved mixture with an additional amount of a base powder, to produce the color powder, wherein the additional amount of base powder is calculated based on an amount of pigment agglomerates filtered out and on a desired ratio, in the color powder, between pigment powder and base powder.

In some embodiments, at least one of the base powder and the compensatory amount of base powder comprises a neutrally-colored base powder.

In some embodiments, at least one of the base powder and the compensatory amount of base powder comprises at least one additive selected from a group consisting of: a matting agent, a flowing agent and a sand-effect agent.

In some embodiments, at least one of the first and the second dry-mixing comprises dry-mixing in a mixer.

In some embodiments, the dry-mixing in the mixer comprises operating the mixer for 15 to 30 minutes.

In some embodiments, the pigment agglomerates larger than a pre-determined size comprise pigment agglomerates larger than 80 µm in diameter.

In some embodiments, the pigment agglomerates larger than a pre-determined size comprise pigment agglomerates larger than 100 µm in diameter.

There is further provided, according to an embodiment, a method for producing a color powder, the method comprising: grinding a pigment powder; performing a first dry-mixing of a base powder with the pigment powder, to produce an initial mixture; filtering out pigment agglomerates larger than a pre-determined size, to produce a sieved mixture; performing a second dry-mixing of the sieved mixture with an additional amount of a base powder to produce the color powder, wherein the additional amount of base powder is pre-determined based on a predicted amount of the pigment agglomerates filtered out and on a desired ratio, in the color powder, between pigment powder and base powder.

There is further provided, according to an embodiment, a color powder adapted to be applied in a color coating process, the color powder comprising at least 20 wt % particles comprising 9 wt % or less pigment.

In some embodiments, said 9 wt % or less pigment comprises 6 wt % or less pigment.

In some embodiments, said 9 wt % or less pigment comprises 3 wt % or less pigment.

In some embodiments, said 9 wt % or less pigment comprises 1 wt % or less a pigment.

In some embodiments, said at least 20 wt % particles comprises at least 30 wt % particles.

In some embodiments, said at least 20 wt % particles comprises at least 40 wt % particles.

In some embodiments, said at least 20 wt % particles comprises at least 50 wt % particles.

In some embodiments, said at least 20 wt % particles comprises at least 60 wt % particles.

There is further provided, according to an embodiment, a color powder adapted to be applied in a color coating process, the color powder comprising: particles essentially free of a base powder; and particles essentially free of a pigment.

In some embodiments, said base powder comprises a neutrally-colored base powder.

In some embodiments, said particles essentially free of said base powder comprise particles having a diameter of 5 µm or less.

In some embodiments, said particles essentially free of said pigment comprise particles having a diameter of 30 µm or more.

There is further provided, according to an embodiment, a color-coated substrate comprising pigment areas, base powder areas and stains, wherein an average diameter of said pigment areas and said base powder areas is 50% or less of an average diameter of said stains.

In some embodiments, at least some of said stains are associated with a base powder.

In some embodiments, at least some of said stains are associated with at least one pigment.

In some embodiments, said 50% or less comprises 40% or less.

In some embodiments, said 50% or less comprises 30% or less.

In some embodiments, said 50% or less comprises 20% or less.

In some embodiments, said 50% or less comprises 10% or less.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION

Figure 1:
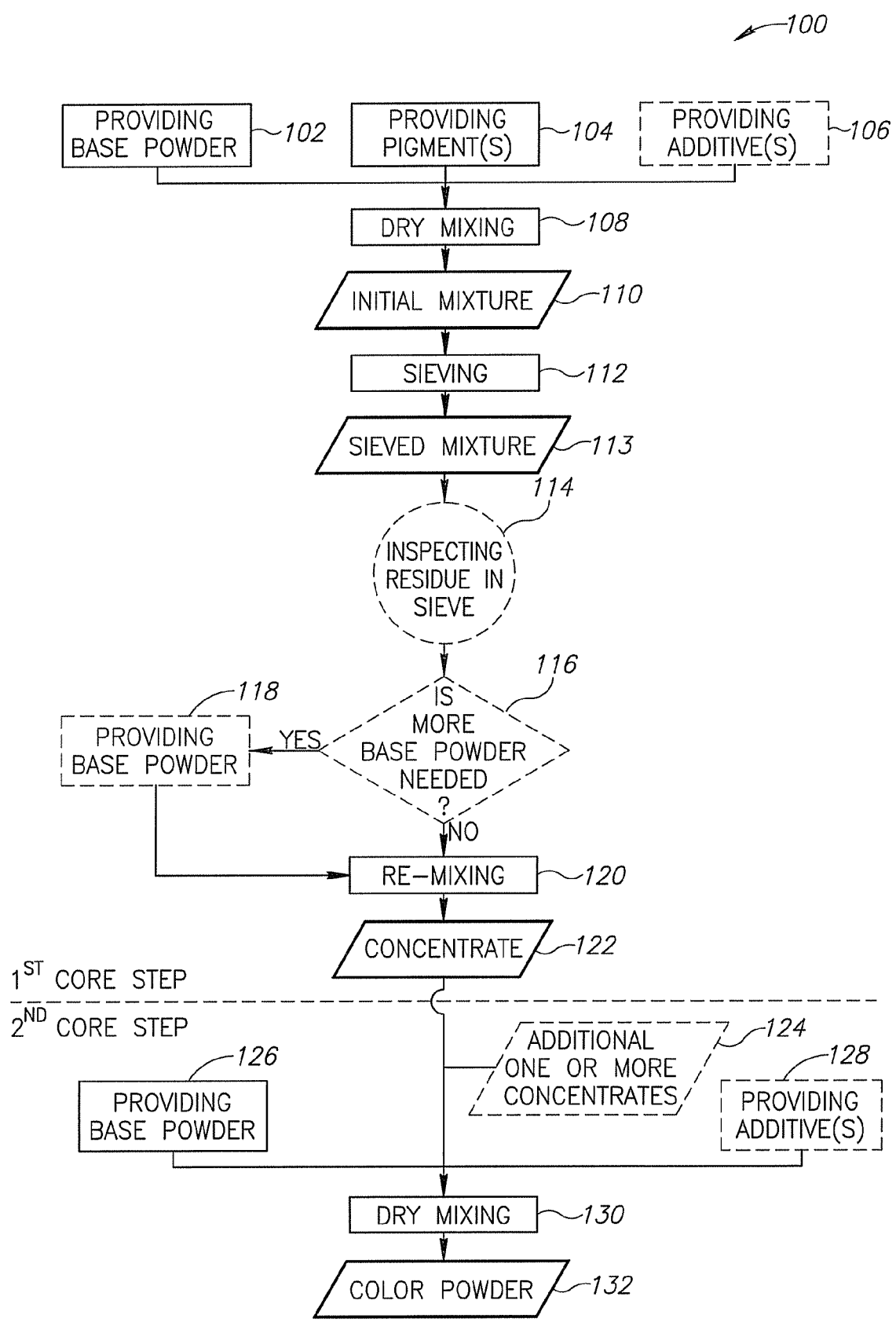
FIG. 1 shows a flow chart of a process for producing a color powder.

An aspect of some embodiments of the disclosure relates to a color powder usable for color coating, and a method for producing such. The production method of the color powder offers a significant advantage over conventional production methods, such as extrusion processes, since the color powder may be produced in an advantageous, cost-effective manner.

The powder may be produced in a process including essentially two core steps. In the first core step, a base powder may be dry-mixed with an excess amount of pigment, to produce an initial mixture. This initial mixture may be sieved, and the sieve may be inspected for pigment loss. An additional, compensatory amount of base powder may then be dry-mixed with the sieved initial mixture (hereinafter "sieved mixture"), to make up for the excess amount of pigment fed into the initial mixture, balanced against the amount of pigment lost in the sieving, if such loss was detected. At the end of the first core step, a color powder concentrate (hereinafter "concentrate") is produced.

Optionally, in an embodiment, the pigment may be ground prior to its introduction into the initial mixture, so that its particle size is reduced. This may result in an essentially homogeneous color powder, which, when applied to a substrate, heated and cured, has a substantially uniform appearance with essentially no or little visible pigment dots.

The feeding of the excess amount of pigment into the initial mixture, together with the later compensatory amount of base powder which is balanced against the amount of lost pigment, may ensure color accuracy of the produced concentrate. This issue is discussed below in greater detail.

Optionally, in an embodiment, it may be possible to reliably predict how much pigment will be lost in the sieving, so that the excess amount of pigment fed into the initial mixture is set to fit that predicted loss. In this embodiment, a compensatory amount of base powder may not be needed, and the sieved mixture may be re-mixed without it.

Optionally, in an embodiment, the sieving may cause any pigment agglomerates in the initial mixture to crumble and pass through the sieve into the sieved mixture. In this embodiment, no excess amount of pigment may need to be fed into the initial mixture; instead, essentially precise amounts of pigment and base powder may be used. Accordingly, no compensatory amount of base powder may be needed in the re-mixing of the sieved mixture.

In the second core step, the concentrate is diluted by dry-mixing it with an additional amount of base powder, to produce a color powder. From an industrial manufacturing point of view, multiple concentrates of different colors, each produced according to the first core step, may be dry-mixed together with an additional amount of base powder, to produce a color powder having a color stemming from the combination of the differently-colored concentrates. Prior to the dry-mixing of the plurality of concentrates with the additional amount of base powder, the concentrates may be produced and stored, to create a repository of concentrates. These stored concentrates may be later be used in such combination that yields a color powder having a new color.

According to some embodiments, the two-step process may be found advantageously capable of providing a concentrate, and later on a color powder, each having an essentially accurate and predictable color.

According to some embodiments, the two-step process may be found advantageously capable of providing a sufficiently uniform color powder, despite the tendency of pigments to clump and stick. The color powder manufactured in the advantageous process may have one or more special particle characteristics, related to the powder's uniformity. In addition, a substrate which is coated using this color powder may also comprise one or more special characteristics.

According to some embodiments, producing a color powder in the two-step process may be superior to producing it in a one-step process. If a large amount of base powder is mixed with a small amount of one or more pigment(s), while trying to create a color powder in a single step, the pigment(s) may clump (form agglomerates), stick, and/or the like. Such clumps may need to be filtered out, by way of sieving or another manner, in order to provide a sufficiently uniform, applicable color powder. Following such filtering, the final color powder may have pigment contents significantly lower than the amount of pigments added into the mixture at the beginning of the process. Therefore, the final color of the color powder may be different than anticipated.

In the advantageous two-step process, however, pigment clumps and/or agglomerates are significantly less abundant, and may often even be regarded as negligible. According to some embodiments, little or no pigment clumps and/or agglomerates are present in a color powder produced using the two-step process.

In addition, this advantageous two-step process may spare the need for an extruder for mixing the base powder and the pigments.

In yet another aspect of some embodiments, the color powder may be produced in a process which includes essentially one core step. In this step, a base powder may be dry-mixed with an amount of ground pigment, to produce an initial mixture. This initial mixture may be sieved, and the sieve may be inspected for pigment loss. An additional, final amount of base powder may then be dry-mixed with the sieved mixture, to produce the color powder, wherein the additional amount is based on a calculation of the remaining pigment in the sieved mixture and a desired ratio between pigment and base powder in the final color powder.

Another aspect of some embodiments relates to a coating layer deposited on a substrate, the coating layer including a color powder. The substrate may be part of an artifact such as an automobile, an industrial tool, furniture, and/or any other artifact which may be enhanced, visually and/or functionally, by way of coating. The coating layer may be applied to the substrate by means of spraying the color powder and/or dipping the substrate in the powder. Heat may then be applied to the coating, causing its melting and subsequent curing. The cured coating layer, when viewed from a top view with magnification, may have an essentially non-uniform appearance, as a result of the diversity of particles constituting the color powder.

Color Powder Production Process

Reference is now made to FIG. 1, which shows a process 100 of producing a color powder. The description of process 100, below, is followed by an example of color powder production, with exemplary numeral values that may contribute to a thorough understanding of the process.

Process 100 is shown, for clarity and convenience of presentation, separated into two parts, a first core step which includes blocks 102-122 and a second core step which includes blocks 124-132. The first and second core steps may either be executed immediately one after the other, or performed during essentially different sessions. That is, it may be desired to produce the color powder in one, continuous session, or to create one or more concentrates by repeating the first core step, place them in storage, and perform the second core step later, when desired.

In a block 102, a base powder is provided. The base powder, sometimes referred to as a "base coat", is optionally a conventional powder available on the market. The base powder includes a melting member—a polymeric agent adapted to melt (or "fuse") when heated and then, when cooled down, to cure and become essentially rigid. A base powder is a basic ingredient in almost any powder-based color coating, hence its name. It supplies the melting member needed for the melting and curing.

The melting member may be virtually any type of polymer—for example, triglycidyl isocyanurate (TGIC) polyester, polyurethane, epoxy phenolic, a hybrid of epoxy and polyester, or any combination thereof. TGIC polyester and polyurethane are often used for coating aluminum substrates or the like, while the polyurethane, specifically, may provide a wood effect (an appearance of wood) to the substrate. Epoxy phenolic is often used for coating metal pipes or the like. The hybrid of epoxy and polyester is often used for coating metal cabinets, shelves or the like. The type of melting member and/or the combination of melting members provided in block 102 as part of the base powder, may therefore be suited to an intended use of a color powder to be produced from the concentrate.

The base powder is optionally neutrally-colored, namely—it becomes transparent or essentially transparent (such as semi-opaque) after it is applied, heated and cured alone, without addition of a pigment. Prior to its application, it may have an essentially white tint.

Alternatively, the base powder may be provided already colored, such as in a white color or any other color. A colored base powder may include particles each being an agglomerate of a melting member and one or more pigments.

Conventional base powders found on the market today are often characterized by a particle size distribution wherein a majority of the particles have a diameter larger than 32 μm (micrometers). For example, a base powder may have a particle size distribution wherein between 54 and 64 weight percentage (54-64 wt %) of the particles have a diameter of between 32 and 80 μm, up to 7 wt % of the particles have a diameter smaller than 12 μm, up to 6 wt % have a diameter between 80 and 125 μm, and the rest have a diameter of between 12 and 32 μm. This particle distribution is given as an example. Various existing base powders may have different particle distributions; such powders are explicitly intended herein. The term "diameter", as referred to herein, may refer to measurement of a longest dimension of a particle. The term "diameter" does not suggest that the particle is necessarily a sphere; most powder particles usually have random three-dimensional shapes.

In a block 104, one or more pigments are provided. The one or more pigments are optionally conventional pigments available on the market. Pigments usually exist in a variety of forms, such as liquids, pastes, powders or the like. The pigment(s) provided in block 104 are optionally dry pigment(s), such as those that come in a powder form (hereinafter "pigment powder"). Pigment powders are often somewhat sticky, with tendency to clump. Their particle size distribution is often smaller than that of the basic powder. Commonly, a median diameter of a pigment powder particle is smaller than 12 μm. Very often, the median diameter is less than 5 μm, sometimes even measuring approximately 1 μm. A clump of multiple particles may sometimes be larger than 12 μm.

Pigment powders come in a variety of colors. An example of a red pigment powder, for instance, is "Red SR1C" powder, manufactured by Cinic Chemicals (Shanghai) Co., Ltd, having the chemical formula of $C_{18}H_{10}O_2N_2Cl_2$.

As mentioned, in block 104 there may be provided one or more pigments. Whereas providing a single pigment powder (such as the aforementioned red powder) may yield a red concentrate at the end of process 100, a combination of multiple pigment powders having different colors may yield a new color. For example, a combination of yellow and magenta pigment powders may yield an essentially red-colored concentrate.

In a block 106, one or more additives may be provided. Additionally or alternatively, one or more additives may already be present in the base powder provided in block 102.

Examples of Additives:

A matting agent, adapted to vary the glossiness of a final, applied coating. A matting agent-free base powder is often considered "glossy", whereas a matting agent added to the base powder may lower its glossiness to levels such as "semi gloss", "semi matt", "matt" and the like.

A flowing agent, enhancing smoothness and/or flowing ability of the base powder.

A texture agent, adapted to provide the final, applied coating with an appearance of a texture.

A sand-effect agent, adapted to provide the final, applied coating with an appearance of sand mixed with the coating.

Optionally, one or more of the additives may be implemented in a base powder of their own, separate from the base powder that is provided in block 102. Some of the additives available on the market today are provided as part of a base powder.

In a block 108, the base powder, the one or more pigments and optionally the one or more additives, are dry-mixed.

The mixing may be conducted in a mixer, which is significantly more cost-effective than an extruder used for making conventional color powders. The mixer may be a blade-type mixer, namely—a mixer which includes one or more rotating blades that perform the mixing, a rotateable mixer, namely—a mixer being a container rotateable around an axis thereby causing its contents to mix, or any other type of mixer.

Optionally, the mixing is performed for a duration of 15-30 minutes, so that the pigment has a chance to aerate and to mix essentially uniformly with the base powder and the optional additives. Alternatively, the mixing may last less than 15 minutes or more than 30 minutes. The mixing duration may be dependent upon factors such the type of pigment, base powder and additives used. The mixing is optionally performed in an environment temperature lower than 30° C., since pigments sometimes tend to become more clumpy as the temperature rises. However, mixing at a temperature higher than 30° C. may also be possible.

The amount of base powder, pigments and additives mixed in the mixer (this amount hereinafter referred to as a "batch") may be lesser than a typical batch produced in a prior art extruder process. This is a substantial advantage over extruder processes, that may be inefficient for making relatively small amounts of color powder. A typical batch in block 108 is between 20 and 150 kilograms (kg), but may be even smaller or larger than that, if a mixer of an adequate capacity is provided.

Optionally, the pigments that are provided constitute 50 wt % or less of the concentrate. A higher percentage may cause degradation of the mixture's uniformity. For example, a higher percentage may prevent the pigments from sufficiently aerating and decreasing their lumpiness; on the other hand, a lower percentage of pigments may allow penetration of more base powder particles between pigment particles during the mixing, thereby aiding the aerating of the pigments and reducing their lumpiness. Optionally, a pigment with a relatively high tendency to lump may be provided at a lower percentage than a pigment with a relatively low tendency to lump.

In some embodiments, the pigments constitute 40 wt % or less, 30 wt % or less, 20 wt % or less, or 10 wt % or less of the concentrate. Nevertheless, in other embodiments, the percentage may be higher than 50 wt %, if, for example, the lumpiness of the pigments is decreased or treated otherwise.

The amount of pigment that is provided in block 104 may be in excess of the amount needed to produce a desired color. In other words, if a certain ratio between base powder and pigment is required to produce a certain desired color, this ratio may be biased in favor of the pigment, either by increasing the amount of pigment or by decreasing the amount of base powder. As mentioned, this excess amount of pigment may preemptively compensate for pigment lost while sieving, as discussed in a subsequent block 112, below.

Alternatively, if the sieving, discussed below in regard to block 112, is known to cause any pigment agglomerates to crumble and pass through the sieve, no excess amount of pigment may be provided in block 104. Instead, since essentially no pigment loss occurs in the sieving, substantially precise amounts of pigment and base powder may be provided. Accordingly, no compensatory amount of base powder may be needed later in the process.

At the end of the dry-mixing of block 108, an initial mixture is produced, as shown in a block 110.

In block 112, the initial mixture is sieved for filtering out particles of a too large diameter, commonly pigments, to produce a sieved mixture 113. Pigments, as mentioned, often tend to clump (also referred to as "form agglomerates"). The sieving may therefore filter out these clumps (also "agglomerates"); in addition, during the sieving, softer clumps may be forced through the apertures of the sieve, thereby causing them to crumble and separate into smaller particles. The sieve optionally has an aperture size of between 80 and 125 µm, although other aperture sizes may also be applicable. The sieve's aperture size may dictate the size of pigment agglomerates that are filtered out and/or get crumbled during the sieving. That is, if it is pre-determined that any pigment agglomerates larger than a certain measurement are to be filtered out and/or crumbled, a sieve having a corresponding aperture size may be used.

The sieve may be a powered sieve, such as a sieve adapted to rotate, vibrate, reciprocate and/or otherwise move. These movements may expedite the sieving process, induce and/or force pigment agglomerates through the sieve's apertures, cause the agglomerates to crumble upon passing through the apertures and/or the like.

Following the sieving, in a block 114, the sieve may be inspected for residue of particles that were filtered out and did not pass through the sieve's apertures. These particles are usually pigments, and therefore the residue is hereinafter referred to simply as "pigment residue". Nonetheless, it may also contain base powder.

If pigment residue is found in the sieve, it may be weighed to determine its amount. Based on the amount of pigment residue, it is calculated, in a block 116, whether more base powder is needed for creating the desired color, which is a combination of a specific ratio between base powder and pigment. That is, the pigment residue is balanced against the redundant amount of fed pigment (the excess amount that was fed minus the real amount that is needed to yield the desired color). The calculation subtracts the amount of pigment residue from the redundant amount of pigment fed into the initial mixture.

If the calculation result is zero, meaning that the pigment residue and the redundant amount of pigment weigh the same, then no more base powder is needed to yield the desired color, and the process proceeds to a block 120. If, on the other hand, the calculation results in a positive number, which means that a redundant amount of pigment still exists in the initial mixture, more base powder may be provided, in a block 118. The amount of additional base powder that is provided may correspond to the ratio between pigment and base powder that is needed in order to yield the desired color. For example, if the ratio is one unit of pigment for every two units of base powder, then additional base powder in the amount of double the positive number is provided.

Optionally, actions of blocks 114-118 are not performed. That is, in an embodiment, it may be possible to reliably predict how much pigment will be lost in the sieving of block 112, so that the excess amount of pigment provided in block 102 is set to fit that predicted loss. In this embodiment, a compensatory amount of base powder (block 118) may not be needed, and sieved mixture 113 may be re-mixed, in block 120 (described below), without it. For example, if it is predicted, optionally based on experimentation, that an X amount of pigment will be lost in the sieving due to agglomeration, an X amount of pigment may be added as the redundant part of the base powder that is provided in block 102.

Alternatively, in an embodiment, actions of blocks 114-118 are not performed where no excess amount of pigment is provided in block 104 and where the sieving of block 112 causes any pigment agglomerates which exist in initial mixture 110 to crumble and pass through the sieve.

In block 120, sieved mixture 113 is re-mixed, whether actions of blocks 114-118 are performed or not. If no more base powder was needed in block 116, and/or if actions of blocks 114-118 are not performed, then sieved mixture 113 is re-mixed essentially as-is. The re-mixing of sieved mixture 113 may cure any non-uniformity that may have been caused by the sieving; in the sieving, base powder particles may fall through the sieve's aperture first, followed by pigment particles, leading to non-uniformity.

If more base powder was needed in block 116 and added in block 118, then the re-mixing, aside from curing any non-uniformities, also blends the additional amount of base powder and initial mixture 113.

At the end of the first core step, in a block 122, a concentrate is produced. As mentioned, from an industrial manufacturing point of view, the first core step may be repeated, each time with a differently-colored pigment or a different combination of multiple pigments, to produce a plurality of differently-colored concentrates. These differently-colored concentrates may then serve as basic color concentrates, from which differently-colored color powders may be made. For example, two basic color concentrates, such as yellow and cyan, may be used for producing a green color powder. The differently-colored concentrates may be stored and used later for producing color powders, such as when a client orders a color powder with a specific color that may be created by combining a plurality of differently-colored concentrates.

The concentrate produced in block 122 may now be optionally accompanied, in a block 124, by additional one or more concentrates that were produced using the first core step. In addition, more base powder is provided in a block 126, in order to dilute the provided concentrate(s) and prepare a color powder essentially ready to be applied.

Optionally, the concentrate(s) constitute 1 wt % or more of the color powder, while the remainder is the additional base powder. In other embodiments, the concentrate(s) constitute 10 wt % or more, 20 wt % or more, or 30 wt % or more of the color powder. Generally, a lower percentage (wherein the concentrate(s) are diluted with more base powder) yields a more light-colored color powder, whereas a higher percentage yields a more dark-colored color powder.

In an optional block 128, one or more additives may be provided. These additives may be of the same types used in block 106, or of different types. Additionally or alternatively, the additives may already be present in the base powder provided.

In a block 130, the base powder, concentrate(s) and optionally the additive(s) are dry-mixed. The dry mixing may be done in a similar manner to the dry mixing of block 108.

In a block 132, the mixed base powder, concentrate(s) and optionally the additive(s) are regarded as a color powder, adapted to be applied to a substrate to be colored. As mentioned, the color powder may be applied to the substrate and then heated and left to cure. After the curing, the color powder becomes a layer of color coating deposited over the substrate. Since the heating melts at least the melting member contained in the color powder, the resulting coating may be essentially similar to a coating made by a prior art extruded powder, in terms of durability, rigidity and/or the like. The resulting coating may also be superior to prior art coating for one or more of these factors.

Figure 4:
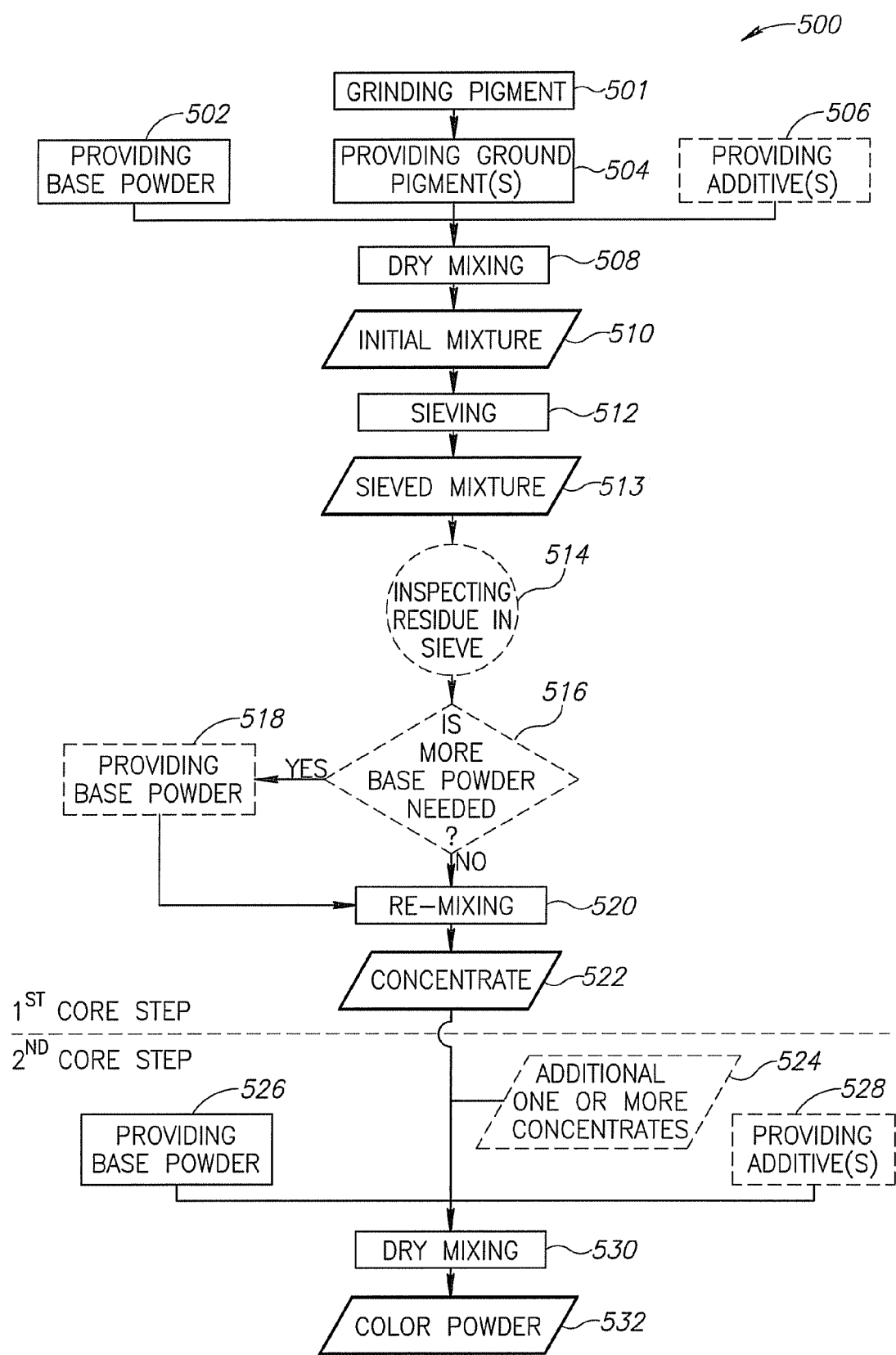
FIG. 4 shows a flow chart of a process for producing a color powder.

Reference is now made to FIG. 4, which shows a process 500 of producing a color powder. Process 500 may essentially be identical to process 100 of FIG. 1, except for blocks 501 and 504.

In a block 501, a pigment powder is ground. The grinding of the pigment powder may be executed using any manual, mechanical, electrical or another machinery or device known in the art, such as a pulverizing machine, a mill and/or a blender having sufficiently sharp blades. The grinding may reduce the size of some or most particles. Alternatively, a pigment powder already having a sufficiently small particle size may be obtained or purchased, so that no actual grinding may be required. In this case, block 501 may be skipped.

A block 504 is similar to block 104 of FIG. 1, except that in block 504 one or more ground pigments are provided.

Providing a ground pigment powder, as shown in block 504, may diminish the formation of agglomerates, and therefore less pigment powder may be lost during sieving, in block 512.

Providing a ground pigment powder, as shown in block 504, may enable the formation of a homogenous color powder. As mentioned, the color powder may be applied to the substrate and then heated and left to cure. After the curing, the color powder becomes a layer of color coating deposited over the substrate. A homogenous color powder may enable the formation of a layer of color coating having an essentially uniform appearance.

Figure 5:
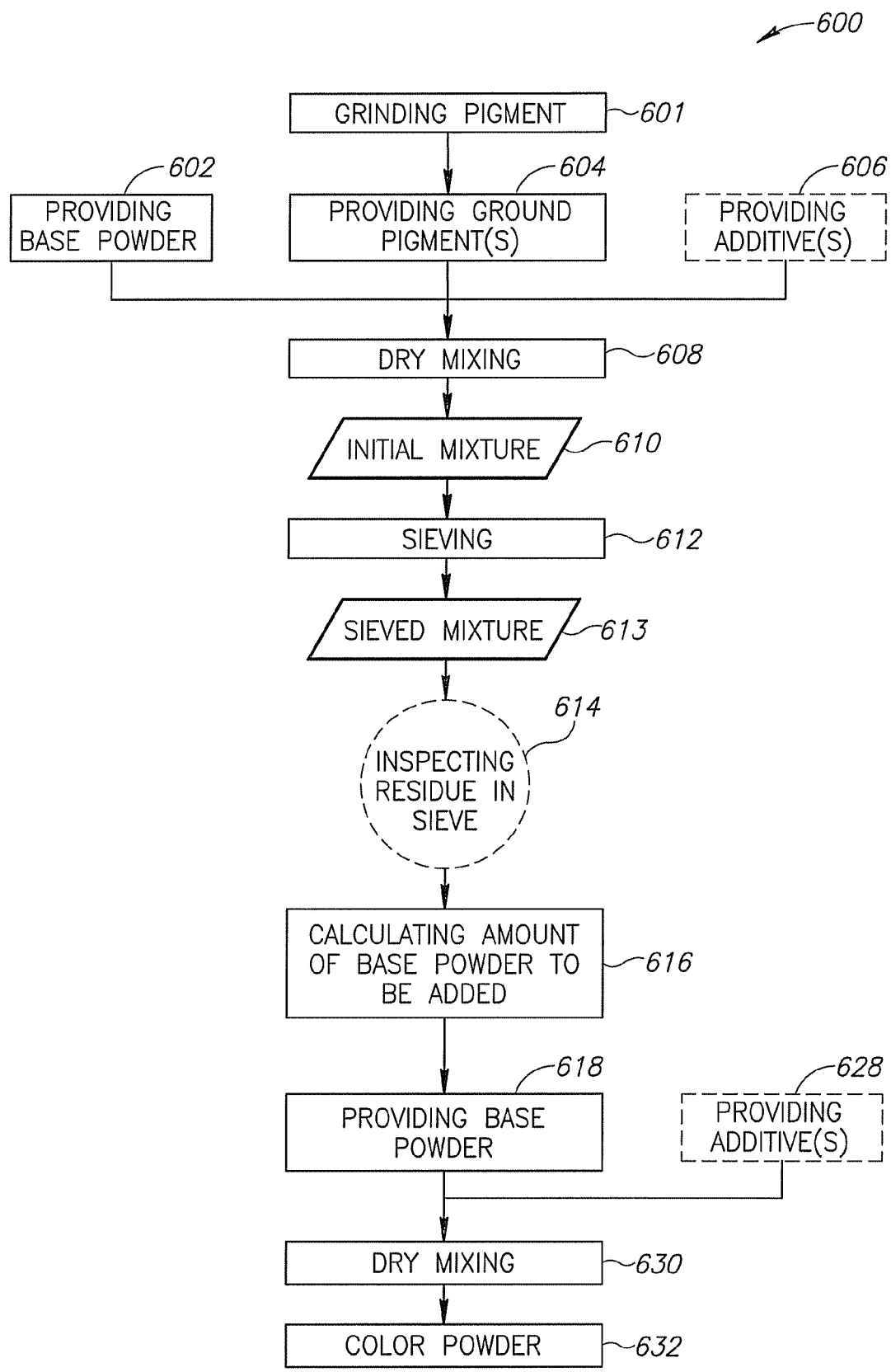
FIG. 5 shows a flow chart of a process for producing a color powder.

Reference is now made to FIG. 5, which shows a process 600 of producing a color powder in an essentially one core step. The description of process 600, below, is followed by an example of color powder production, with exemplary numeral values that may contribute to a thorough understanding of the process.

Blocks 601-614 may essentially be identical to blocks 501-514 shown in FIG. 4.

If a pigment residue is found in the sieve, in a block 614, it may be weighed to determine its amount. Based on the amount of pigment residue, it is calculated, in a block 616, what is the remaining amount of pigment powder in the sieved mixture. Then, it is calculated how much additional base powder is required to form a final color powder, based on a desired ratio of pigment powder to base powder in the final color powder.

Alternatively, an experiment may be performed, to determine the amount of pigment that would be lost in the sieving of future processes performed in similar environmental conditions (such as humidity, temperature and/or the like). When this amount is determined, the calculation of block 616 may be performed once, and the results of the calculation may be used in future processes without the need to re-calculate each time.

The amount of the additional base powder is then provided, in a block 618.

Blocks 628-632, are essentially identical to blocks 528-532 respectively, shown in FIG. 4.

Examples of Color Powder Production Processes

Process 100 of producing a color powder may be better understood by referring to the example below, which includes arbitrarily-chosen numerical values. This example is intended to be illustrative rather than restrictive.

For the purpose of the example, it is assumed that a red color powder is intended to be produced. The red color of the color powder may be achieved by a combination of 2% yellow pigment, 2% magenta pigment and 96% of base powder. It is also assumed, arbitrarily, that a concentrate of 50% pigment and 50% base powder is to be produced using each of these pigments.

The yellow and magenta concentrates are to be produced separately, each according to the first core step of process 100. For simplicity of presentation, the first core step is described here only in regard to the yellow pigment, but the magenta concentrate is similarly produced.

In block 102, 1.8 kg of base powder are provided, while in block 104, 2.3 kg of yellow pigment powder are provided. The redundant part of the yellow pigment is therefore 0.5 kg, which means that a redundant 27.7% of pigment is provided above and beyond the real amount needed to produce the desired color, which is 1.8 kg of each of the base powder and pigment (since a concentrate of 50% pigment and 50% base powder is to be produced).

In block 108, the base powder and yellow pigment are dry mixed, to produce an initial mixture in block 110. The initial mixture is sieved in block 112, and the sieve is inspected for residue in block 114. The inspection detects pigment residue in the amount of 0.3 kg. The sieved initial mixture, therefore, now contains 1.8 kg base powder and 2 kg pigment. In block 116, the amount of residue (0.3 kg) is subtracted from the redundant part of the yellow pigment fed into the initial mixture (0.5 kg), and the result is 0.2 kg. In other words, in order to balance the redundant yellow pigment against the residue, it is required to add additional 0.2 kg of base powder to the sieved initial mixture.

The 0.2 kg of additional base powder is provided in block 118, and the ingredients are re-mixed in block 120, to produce a yellow concentrate in block 122. The yellow concentrate therefore contains 2 kg of base powder and 2 kg of yellow pigment, which is exactly the desired 50%-50% distribution.

Next, the yellow concentrate, and a magenta concentrate produced in a similar manner, may be either moved immediately into the second core step or stored in a repository awaiting an order for a red color powder.

In the second core step, the yellow concentrate produced in block 122, as well as the similarly-produced magenta concentrate of block 124, are provided. Each of the yellow and magenta concentrates contains 2 kg of base powder and 2 kg of pigment.

In block 126, base powder in the amount of 92 kg is provided, and dry-mixed in block 130 with the two concentrates. At the end of the second core step, in block 132, a red color powder, containing 96% base powder, 2% yellow pigment and 2% magenta pigment, is produced. Table 1 shows the base powder and pigment contents of each of the ingredients constituting the red color powder produced in block 132.

TABLE 1

Base powder and pigment contents in the red color powder

|  | Yellow pigment | Magenta pigment | Base powder | Total |
|---|---|---|---|---|
| Yellow concentrate (block 122) | 2 kg | — | 2 kg | 4 kg |
| Magenta concentrate (block 124) | — | 2 kg | 2 kg | 4 kg |
| Base powder (block 126) | — | — | 92 kg | 92 kg |
| Total | 2 kg | 2 kg | 96 kg | 100 kg |
| (red color powder, block 132) | (2%) | (2%) | (96%) | (100%) |

Similarly, process 600 of producing a color powder may be better understood by referring to the example below, which includes arbitrarily-chosen numerical values. This example is intended to be illustrative rather than restrictive.

For the purpose of the example, it is assumed that a green color powder is intended to be produced. The green color of the color powder may be achieved by a combination of 5% green pigment and 95% of base powder.

In block 602, 1 kg of base powder is provided, while in block 601, 1 kg of green pigment powder is grinded and then provided in block 604. In an optional block 606, one or more additives may be provided.

In block 608, the base powder and green pigment are dry mixed, to produce an initial mixture in block 610. The initial mixture is sieved in block 612, and the sieve is inspected for residue in block 614. The inspection detects pigment residue in the amount of 0.2 kg. In block 616, the amount of sieved pigment in the sieved initial mixture is calculated. The sieved initial mixture, therefore, now contains 1 kg base powder and 0.8 kg pigment. Since our remaining 0.8 kg of pigment should constitute 5% of the final amount color powder to yield the desired color, the amount of base powder that would constitute the missing 95% would be 15.2 kg, and the total amount of the final color powder (100%) would be 16 kg.

Since 1 kg of base powder was already provided in block 602, in a block 618 14.2 kg of additional base powder may be provided. In an optional block 628, one or more additives may be provided.

The ingredients may be dry mixed in a block 630, to produce a final, green color powder in a block 632.

Color Powder Characteristics

As mentioned, particles of a conventional color powder manufactured in an extrusion process may consist of agglomerates, substantially each containing both pigment(s) and base powder(s) fed to the extruder. That is, the melting process in the extruder is capable of forming a very uniform blend.

Figure 2A:
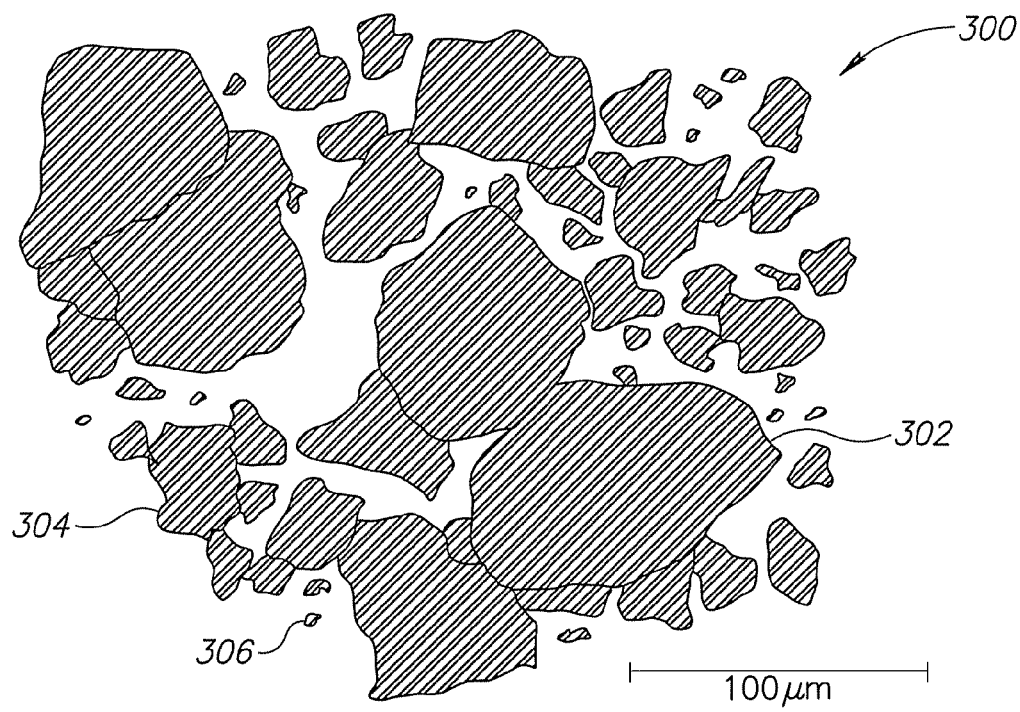
FIG. 2A shows a semi-pictorial, magnified view of a color powder, according to the prior art.

Reference is now made to FIG. 2A, which shows a semi-pictorial, magnified view of a prior art color powder 300, according to the prior art. Prior art color powder 300 is therefore hereinafter referred to as an "old powder" 300. Old powder 300 includes particles of a variety of sizes, the result of the essentially random grinding process that follows the extrusion. For example, there may exist in old powder 300 a first particle 302 of an approximately 100 μm diameter, a second particle 304 of an approximately 40 μm diameter, and a third particle 306 of an approximately 5 μm diameter. All three particles, as well as other non-referenced particles, may each be an agglomerate including a base powder and pigment(s).

A series of lab tests were performed in order to determine the chemical contents of particles of an exemplary prior art powder, such as old powder 300. The results of the test do not necessarily represent exactly each and every prior art powder, but are rather intended to generally characterize such powders.

Table 2 below shows weight percent contents of various chemical elements found in five prior art powder particles sampled, each of the particles having a diameter of between 30 and 50 μm.

TABLE 2

30-50 μm particles, prior art

| Element |  | Particle 1 | Particle 2 | Particle 3 | Particle 4 | Particle 5 |
|---|---|---|---|---|---|---|
| C |  | 67.85 | 62.82 | 70.90 | 70.36 | 68.04 |
| O |  | 24.39 | 27.96 | 17.68 | 19.51 | 25.04 |
| Pigment- | Si | 0.09 | 0.09 | 0.09 | 0.06 | 0.09 |
| associated | S | 1.67 | 3.07 | 1.83 | 0.91 | 1.35 |
|  | Ti | 3.77 | 2.28 | 6.29 | 5.73 | 3.70 |
|  | Ba | 1.69 | 3.16 | 2.77 | 2.95 | 1.35 |
|  | Al | 0.33 | 0.29 | 0.40 | 0.45 | 0.37 |

All five particles shown in Table 2 include a substantial amount of carbon (C) and oxygen (O); carbon is in the range of 62.82-70.90 wt %, and oxygen is in the range of 17.68-27.96 wt %. Carbon and oxygen are known to be a major ingredient in many existing base powders, as well as in many conventional pigments. However, the existence of other elements in the particles may often suggest the presence of pigments, since pigments often contain various metals and other elements. And indeed, each of the sampled particles was found to include elements such as silicon (Si), sulfur (S), titanium (Ti), barium (Ba) and aluminum (Al). The ratio of the joint carbon and oxygen to the rest of the elements fits well with common ratios of base powder to pigment. The average joined weight percentage of carbon and oxygen is 90.91 wt %, which means that the remaining elements are accountable for 9.09 wt %.

Contrary to old powder 300, a color powder of the present disclosure demonstrates chemical contents that are significantly different than that of the old powder. That is, the color powder of the disclosure contains dry-mixed, rather than extruded, base powder and pigment particles. Since pigment particles are often smaller than 12 μm and base powder particles often come in a variety of sizes, it is likely that particles of the present color powder which are larger than the pigment particles, and optionally larger than 30 μm, contain essentially only elements associated with the base powder (this particles referred to as "essentially free of pigment"). At the same time, smaller particles divide between particles associated with a base powder and particles associated with a pigment (the latter are referred to as "essentially free of base powder"). And indeed, it is shown that a color powder according to some embodiments of the present disclosure may be distinguished from a prior art powder.

Figure 2B:
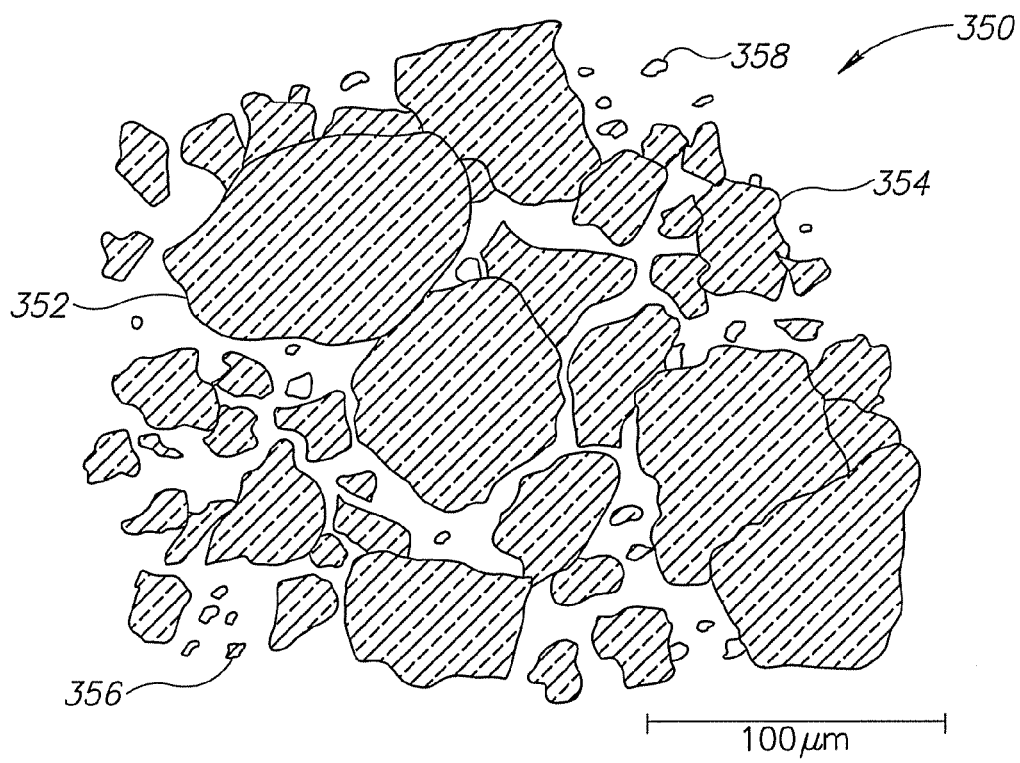
FIG. 2B shows a semi-pictorial, magnified view of a color powder.

Reference is now made to FIG. 2B, which shows a semi-pictorial, magnified view of a color powder 350 of the present disclosure. Color powder 350 includes particles of a variety of sizes. For example, there may exist in color powder 350 a first particle 352 of an approximately 100 μm diameter, a second particle 354 of an approximately 40 μm diameter, a third particle 356 of an approximately 5 μm diameter, and a fourth particle 358 of an approximately 6 μm diameter. The first three particles, 352-356, as well as other non-referenced particles, may each be associated with the base powder, while fourth particle 358 may be associated with a pigment. In other words, particles of color powder 350 which are essentially larger than pigment particles (namely, larger than 1, 5, or even 12 µm) may be associated substantially with a base powder, whereas some of the smaller particles may be associated substantially with the base powder and some with a pigment.

Table 3 below shows weight percent contents of various chemical elements found in five color powder particles produced essentially according to a method of the present disclosure, each of the particles having a diameter of between 30 and 50 µm.

TABLE 3

30-50 µm particles, present color powder

| Element | | Particle 1 | Particle 2 | Particle 3 | Particle 4 | Particle 5 |
|---|---|---|---|---|---|---|
| C | | 79.89 | 78.03 | 78.02 | 80.24 | 72.20 |
| O | | 14.89 | 18.83 | 17.57 | 14.94 | 16.41 |
| Pigment- | Si | 0.25 | 0.17 | 0.22 | 0.19 | 0.15 |
| associated | S | 0.23 | 0.69 | 0.56 | 0.81 | 0.36 |
| | Ti | 1.48 | 0.78 | 0.38 | 0.73 | 0.49 |
| | Ba | 0.77 | 0.39 | 0.65 | 0.94 | 0.30 |
| | Al | 0.25 | 0.25 | 0.31 | 0.31 | 0.19 |

As visible in Table 3, amounts of pigment-associated elements are considerably lower than those seen in Table 2, which relates to corresponding-size particles of a prior art powder. These amounts may even be regarded as insignificant residues or traces of pigments. This is due to the fact that in the dry-mixing process of the present disclosure, as opposed to a prior art extrusion process, essentially no agglomerates of base powder particles and pigments are formed. Therefore, particles larger than those of the pigments that are fed into the mixer, are likely to be mainly associated with the base powder.

The average joined weight percentage of carbon and oxygen is 94.20 wt %, which means that the remaining elements are accountable for 5.80 wt %.

Hence, a lab examination of particles larger than pigment particles (for example, larger than 1, 5 or even 12 µm) of a given color powder may reveal whether the color powder was manufactured in a process according to the present disclosure, or whether it was manufactured in an extrusion process. Low or insignificant contents of pigment-associated elements may suggest that the examined powder is a powder of the present disclosure. Persons of skill in the art will recognize that the lab results presented here are meant to be illustrative rather than restrictive. Color powders according to the present disclosure may have different chemical element contents than what is shown in Table 3.

Hence, in an embodiment, at least 20 wt % of particles of a color powder contain 9 wt % or pigment. In other words, the 20 wt % of the particles are essentially associated with a base powder and not with a pigment, since the 9 wt % or less chemical elements associated with a pigment found in them, mean they are not associated with a pigment; this percentage is too low to associate the particles with a pigment.

Also, in other embodiments, at least 30 wt %, 40 wt %, 50 wt %, 60 wt %, 70 wt % or 80 wt % particles of a color powder, contain 6 wt % or less, 3 wt % or less, or 1 wt % or less pigment.

The term "pigment", herein, relates to chemical contents of any pigment known in the art, such as a pigment of one of the following classifications: Inorganic pigments, titanium dioxide pigments, carbon black pigments, organic pigments, metallic pigments and pearlescent pigments. Pigments are further discussed in David M. Howell, David A. Bate and James D. Sanders, *Powder Coatings: The Technology Formulation and Application of Powder Coatings* (2000), incorporated herein by reference in its entirety.

Coated Substrate Characteristics

Figure 3A:
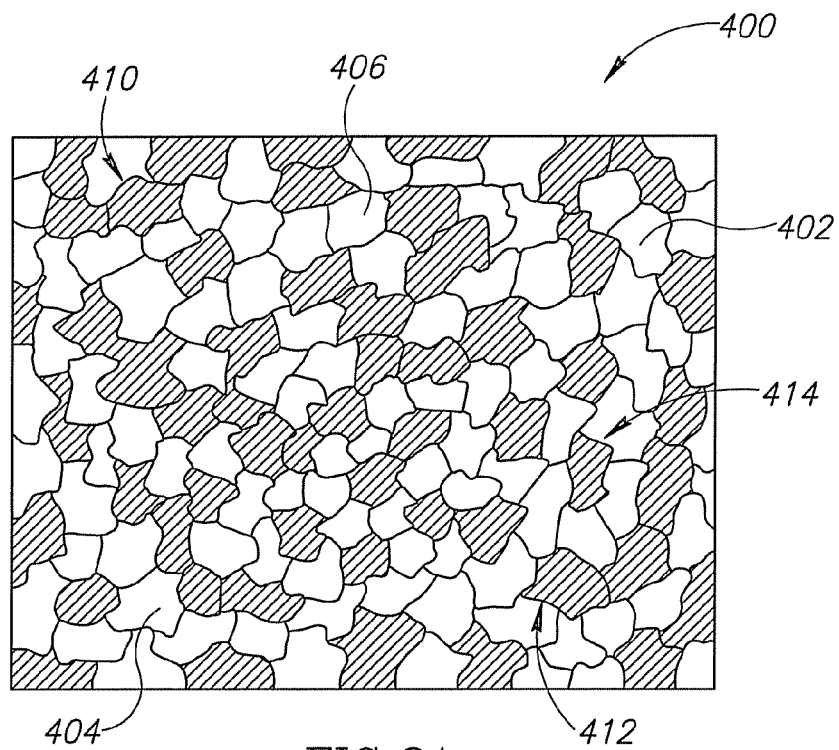
FIG. 3A shows a semi-pictorial, magnified top view of a coated substrate, according to the prior art.

Since particles of a common extruded color powder are essentially agglomerates of base powder and pigment(s), the final appearance of such powders, after they are applied, heated and cured, is usually very uniform. Reference is now made to FIG. 3A, which shows an exemplary semi-pictorial, magnified top view of a coated substrate 400, according to the prior art. The figure is an illustration of an SEM (scanning electron microscope) photograph of an exemplary plate coated with a prior art, extruded powder.

Hatched areas in the figure represent pigments, and are hereinafter referred to as "pigment areas". Examples of such pigment areas are pigment areas 410, 412 and 414. Non-hatched areas represent base powder, and are hereinafter referred to as "base powder areas". Examples of such base powder areas are base powder areas 402, 404 and 406. When viewed with an SEM, pigment areas 410, 412 and 414 may appear darker than base powder areas 402, 404 and 406. As shown in the figure, the spread of pigment areas and base powder areas is fairly uniform throughout coated substrate 400.

Persons of skill in the art will recognize that FIG. 3A is intended to express the general characteristics of extruded coatings, and is not necessarily an exact view of all existing extruded coatings. Other extruded coatings may include areas of different sizes, shapes, spread, density and/or the like.

Figure 3B:
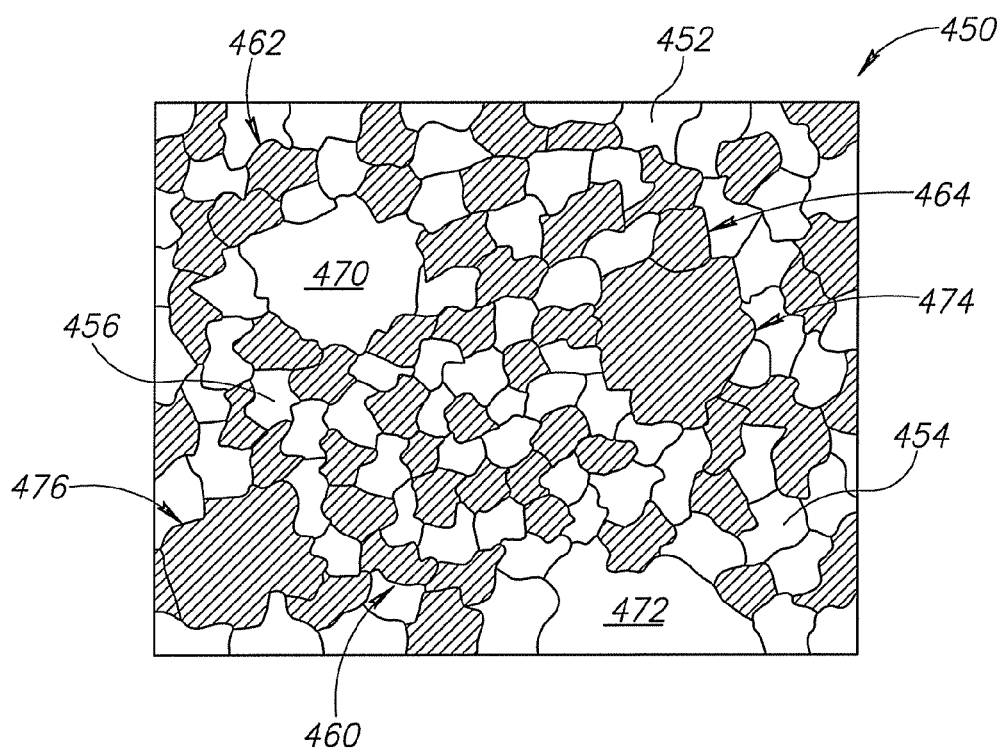
FIG. 3B shows a semi-pictorial, magnified top view of a coated substrate.

Contrary to extruded coatings, a color powder of the present disclosure, after being applied, heated and cured, may have an essentially different appearance. Reference is now made to FIG. 3B, which shows an exemplary semi-pictorial, magnified top view of a coated substrate 450, according to embodiments of the present disclosure. Similar to FIG. 3A, hatched areas in FIG. 3B represent pigment areas, such as pigment areas 460, 462 and 464. Non-hatched areas represent base powder areas, such as base powder areas 452, 454 and 456.

As shown, the appearance of coated substrate 450 is less uniform than coated substrate 400 of FIG. 3A. Coated substrate 450 includes noticeable stains of pigments and/or base powder. By way of example, base powder stains 470 and 472, shown non-hatched, noticeably impair the visual uniformity of coated substrate 450. As another example, pigment stains 474 and 476, shown hatched, also noticeably impair the visual uniformity of coated substrate 450. Base powder stains 470 and 472 as well as pigment stains 474 and 476 may be substantially larger than base powder areas 452-456 and pigment areas 460-464. In addition, each of the stains may also have a diameter different than other existing stains.

In an embodiment, an average diameter of pigment and/or base powder areas is 50% or less of an average diameter of pigment and/or base powder stains. In the exemplary FIG. 3B, each of pigment areas 460-464 and base powder areas 452-456 are shown having a diameter of approximately 50% of a diameter of each of pigment stains 474-476 and base powder stains 470-472. These exemplary diameter are for illustrative purposes only.

In other embodiments, an average diameter of pigment and/or base powder areas is 40% or less, 30% or less, 20% or less, or 10% or less of an average diameter of pigment and/or base powder stains.

The non-uniformity of coated substrate 450 may be explained by the characteristics of the color powder of the present disclosure. As mentioned, the color powder includes larger particles which are essentially associated with a base powder, and smaller particles which distribute between particles associated with the base powder and particles associated with pigment(s). However, if the noticeable spots of the non-uniformity are small enough as to not be noticed with the naked eye, the non-uniformity of coated substrate 450 need not be a nuisance. Therefore, despite the fact that the color powder of the present disclosure may provide a final product which is less uniform than what provided by extruded powders, it is still industrially superior; the lack of need of an extruder to produce the color powder, combined with non-uniformity unnoticeable with the naked eye (and which is therefore not a material compromise at all), offers a great advantage over extruded powders and methods of producing such.

Persons of skill in the art will recognize that FIG. 3B is intended to express the general characteristics of a coated substrate of the present disclosure, and is not necessarily an exact view of all possible embodiments of such a substrate. Other coated substrates may include areas and/or stains of different sizes, shapes, spread, density and/or the like. For example, the frequency of appearance of stains that impair the visual uniformity may be different. Other exemplary factors that may vary are stain and/or area shape, size and/or the like.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In the description and claims of the application, each of the words "comprise" "include" and "have", and forms thereof, are not necessarily limited to members in a list with which the words may be associated.

What is claimed is:

1. A method for producing a color powder concentrate, the method comprising:
   performing a first dry-mixing of a base powder with an excess amount of a pigment powder to produce an initial mixture;
   filtering out pigment agglomerates larger than a pre-determined size, to produce a sieved mixture; and
   performing a second dry-mixing of the sieved mixture with a compensatory amount of a base powder to produce the color powder concentrate, wherein the compensatory amount of the base powder is determined based on the excess amount of the pigment powder and on an amount of the pigment agglomerates filtered out.

2. The method according to claim 1, wherein the pigment powder comprises at least 50 wt % particles having a diameter of 5 μm or less.

3. The method according to claim 1, further comprising dry-mixing the color powder concentrate with an additional amount of a base powder, to produce a color powder adapted to be applied in a color coating process.

4. The method according to claim 1, further comprising grinding the pigment powder prior to the first dry-mixing.

5. The method according to claim 4, further comprising dry-mixing the color powder concentrate with an additional amount of a base powder, to produce a color powder adapted to be applied in a color coating process, wherein the color powder is adapted to provide a substrate onto which the color powder is applied with a substantially uniform appearance.

6. The method according to claim 1, wherein at least one of the base powder and the compensatory amount of base powder comprises a neutrally-colored base powder.

7. The method according to claim 1, wherein at least one of the base powder and the compensatory amount of base powder comprises at least one additive selected from a group consisting of: a matting agent, a flowing agent and a sand-effect agent.

8. The method according to claim 1, wherein at least one of the first and the second dry-mixing comprises dry-mixing in a mixer.

9. The method according to claim 8, wherein the dry-mixing in the mixer comprises operating the mixer for 15 to 30 minutes.

10. The method according to claim 1, wherein the pigment agglomerates larger than a pre-determined size comprise pigment agglomerates larger than 80 μm in diameter.

11. The method according to claim 10, wherein the pigment agglomerates larger than a pre-determined size comprise pigment agglomerates larger than 100 μm in diameter.

12. A method for producing a color powder concentrate, the method comprising:
   performing a first dry-mixing of a base powder with an excess amount of a pigment powder to produce an initial mixture;
   filtering out pigment agglomerates larger than a pre-determined size, to produce a sieved mixture; and
   performing a second dry-mixing of the sieved mixture, wherein the excess amount of the pigment powder is pre-determined based on a predicted amount of the pigment agglomerates filtered out.

13. A method for producing a color powder, the method comprising:
   grinding a pigment powder;
   performing a first dry-mixing of a base powder with the pigment powder, to produce an initial mixture;
   filtering out pigment agglomerates larger than a pre-determined size, to produce a sieved mixture;
   performing a second dry-mixing of the sieved mixture with an additional amount of a base powder, to produce the color powder, wherein the additional amount of base powder is calculated based on an amount of pigment agglomerates filtered out and on a desired ratio, in the color powder, between pigment powder and base powder.

14. The method according to claim 13, wherein at least one of the base powder and the compensatory amount of base powder comprises a neutrally-colored base powder.

15. The method according to claim 13, wherein at least one of the base powder and the compensatory amount of base powder comprises at least one additive selected from a group consisting of: a matting agent, a flowing agent and a sand-effect agent.

16. The method according to claim 13, wherein at least one of the first and the second dry-mixing comprises dry-mixing in a mixer.

17. The method according to claim 16, wherein the dry-mixing in the mixer comprises operating the mixer for 15 to 30 minutes.

18. The method according to claim 13, wherein the pigment agglomerates larger than a pre-determined size comprise pigment agglomerates larger than 80 μm in diameter.

19. The method according to claim 18, wherein the pigment agglomerates larger than a pre-determined size comprise pigment agglomerates larger than 100 μm in diameter.

20. A method for producing a color powder, the method comprising:

grinding a pigment powder;

performing a first dry-mixing of a base powder with the pigment powder, to produce an initial mixture;

filtering out pigment agglomerates larger than a pre-determined size, to produce a sieved mixture;

performing a second dry-mixing of the sieved mixture with an additional amount of a base powder to produce the color powder, wherein the additional amount of base powder is pre-determined based on a predicted amount of the pigment agglomerates filtered out and on a desired ratio, in the color powder, between pigment powder and base powder.

* * * * *